United States Patent

Uhl et al.

Patent Number: 4,471,097
Date of Patent: Sep. 11, 1984

[54] WATER SOLUBLE COPOLYMERS CONTAINING VINYL IMIDAZOLE AS DRILLING FLUID ADDITIVES

[76] Inventors: Klaus Uhl, D 6230 Frankfurt (M) 80, Fed. Rep. of Germany; James K. Bannerman, 10201 Westheimer, P.O. Box 1407, Houston, Tex. 77001; Friedrich J. Engelhardt, 6000 Frankfurt (M) Fechenheim, Fed. Rep. of Germany; Arvind Patel, P.O. Box 1407, Houston, Tex. 77001

[21] Appl. No.: 338,543

[22] Filed: Jan. 11, 1982

[51] Int. Cl.³ ............................................. C08F 228/02
[52] U.S. Cl. ................................... 526/240; 166/271; 252/8.55 R; 525/326.7; 525/369; 526/263; 526/287
[58] Field of Search .................... 526/263, 287, 240; 525/369

[56] References Cited

U.S. PATENT DOCUMENTS

| | | | |
|---|---|---|---|
| 4,048,077 | 9/1977 | Engelhardt | 526/287 |
| 4,151,333 | 4/1979 | Lenke | 526/287 |
| 4,309,523 | 1/1982 | Engelhardt | 526/240 |

*Primary Examiner*—C. A. Henderson
*Attorney, Agent, or Firm*—Connolly and Hutz

[57] ABSTRACT

Auxiliary agents for chemical flooding of petroleum deposits and auxiliary agents used in well drilling fluids are water-soluble copolymers containing a statistical distribution of (a) 5 to 95% by weight of structural units of formula I

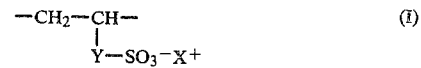

(b) 0 to 30% by weight of structural units of formula II

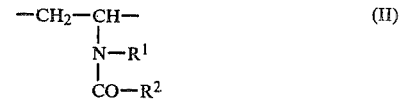

(c) 0 to 80% by weight of structural units of formula III

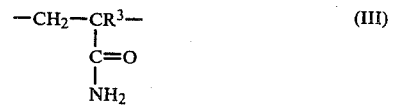

(d) 5 to 60% by weight of structural units of formula IV

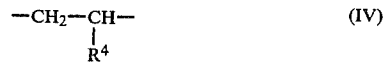

wherein
$R^1$ and $R^2$ are the same or different and represent hydrogen, methyl, or ethyl or together are trimethylene to cyclic pentamethylene;
$R^3$ represents hydrogen or methyl;
$R^4$ represent a imidazolyl-(1) or imidazolyl-(2) moiety;
Y is a single covalent bond or the formula $-CO-NH-C(CH_3)_2-CH_2-$; and
$X^+$ is a cation.

6 Claims, No Drawings

WATER SOLUBLE COPOLYMERS CONTAINING VINYL IMIDAZOLE AS DRILLING FLUID ADDITIVES

BACKGROUND OF THE INVENTION

During the drilling of an oil well using rotary drilling techniques, filtrate from the drilling fluid may be forced into the adjacent subterranean formation. In the case of aqueous drilling fluids the filtrate is essentially water, which may have certain undesirable effects on the formation. This invention relates to certain unique polymers which, when dispersed in aqueous drilling fluids, exhibit a superior ability to reduce this tendency of the drilling fluid filtrate to enter the adjacent formation. The polymers of this invention also have excellent calcium tolerance and has excellent thermal stability compared with commercial fluid additives.

DETAILED DESCRIPTION OF THE INVENTION

This invention relates to water-soluble copolymers, which comprise structural units which are:

(a) 5 to 90% by weight of the

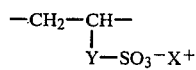  (I)

(b) 5 to 30% by weight of the formula II

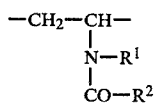  (II)

(c) 0 to 80% by weight of the formula III

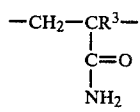  (III)

(d) 5 to 60% by weight of the formula IV

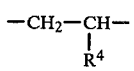  (IV)

(e) 0 to 50% by weight of the formula V

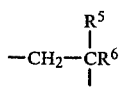  (V)

and (f) 0 to 25% by weight of a cross linking agent having at least two olefinic double bonds; wherein $R^1$ and $R^2$ are the same or different and represent hydrogen, methyl or ethyl or together are trimethylene to pentamethylene;

$R^3$ and $R^5$ represent hydrogen or methyl;

$R^4$ represents a imidazolyl-(1) or a imidaxolyl-(2) moiety;

$R^6$ represents hydroxy, alkoxycarbonyl with 1 to 12 carbon atoms in alkoxy moiety, cycloalkoxycarbonyl with 6 to 10 carbon atoms in cycloalkoxy moiety, phenyl, alkanoyloxy with 1 to 4 carbon atoms, or β-hydroxyalkoxycarbonyl with 2 or 3 carbon atoms in hydroxyalkoxy moiety;

Y has the formula $-CO-NH-C(CH_3)_2-CH_2-$ or is a single covalent bond; and $X^+$ represents a cation.

Another embodiment of this invention relates to water soluble copolymers, which comprise structural units which are:

(a) 1 to 95% by weight of the

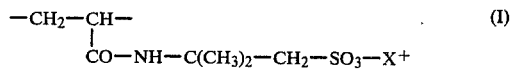  (I)

(b) 0 to 30% by weight of the formula II

  (II)

(c) 0 to 80% by weight of the formula III

  (III)

(d) 5 to 60% by weight of the formula IV

  (IV)

(e) 0 to 50% by weight of the formula V

  (V)

and (f) 0 to 25% by weight of a cross linking agent containing at least two olefinic double bonds; wherein $R^1$ through $R^6$ and $X^+$ are as defined above.

Preferred copolymers according to this invention are, of 20 to 80% by weight of units of formula I, 0 to 15% by weight of units of formula II, 0 to 40% by weight of units of formula III, 0 to 20% by weight of units of formula V, and 5 to 50% by weight of units of formula IV, with $R^4$ being the imidazolyl-(1) moiety. Where components are recited as having a zero content it will be understood that a preferred lower range amount is 1%.

The alkyl moiety of the alkoxycarbonyl group in $R^6$ include, inter alia, methyl, ethyl, propyl, isopropyl, N-butyl-(1), N-butyl-(2), isobutyl, tert-butyl, amyl, neopentyl, hexyl, 2-ethylhexyl-(1), octyl, dodecyl and the alkyl moiety is either linear or branched.

The cyclic alkane moiety of the cycloalkoxycarbonyl group in $R^6$ may be monocyclic, for example cyclohexane, or polycyclic, for example bornyl, isobornyl, norbornyl, and derivatives of those terpenes.

The β-hydroxylalkyl moiety in $R^6$ may be β-hydroxyethyl, 2-hydroxypropyl-(1) or 1-hydroxypropyl-(2).

Cation $X^+$ theoretically can be obtained from and correspond to any known water-soluble base which is strong enough to neutralize the sulfonic acid groups of the copolymers according to the invention and which does not affect the water-solubility of the copolymers. Selection can therefore be made by using a simple, known method. For example, $X^+$ can be an alkali metal cation (especially a sodium or a potassium cation) or an ammonium cation $HNR_3^7$. The three $R^7$ moieties can be the same or different and each represents hydrogen, alkyl having 1 to 4 carbon atoms or hydroxyethyl.

Upon partial hydrolysis of the copolymers of this invention, a portion of up to 60%, preferably of 10 to 30%, of the amide function in formula III and ester function in formula V are converted to carboxyl function of formula (VI).

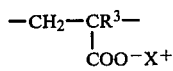
(VI)

where $R^3$ and $X^+$ have the meanings indicated above. In many cases, the excellent dispersion-stabilizing and viscosity-increasing effects of the copolymers of this invention and of their partial hydrolyzed derivatives in concentrated salt solutions, as well as their temperature stability, may be further enhanced by the presence of anions.

The copolymers of this invention may, of course, contain in the polymer molecule several different individual elements from the structural units defined in formula I to VI with these individual elements being differentiated according to the meaning of Y or $R^1$ and $R^2$ or $R^3$ or $R^4$ or $R^5$ or $R^6$.

Thus, for example, in the same polymer molecule there may be present both 2-acrylamido-2-methyl propane sulfonic acid-(3) (AMPS) and vinyl sulfonic acid units, or ring-open vinyl amide units in addition to the ring-closed vinyl amide units according to formula II, or imidazolyl-(1) in addition to imidazolyl-(2)-moieties, or also isobornylmethacrylate in addition to poly-(vinyl-alcohol).

Preferred examples for the cross-linking agent containing at least two olefinic double bonds are divinylbenzene, methylenebisacrylamide, tetraallyloxethane, hexaallylsaccharose, and triallylisocyanurate.

As a rule, the copolymers of this invention, contain not more than five (preferably not more than four, more preferably not more than three) of the various units from the individual groups according to formula I to V and optionally the cross linking agent.

The synthesis of water-soluble polymers, containing sulfonic acid moieties incorporated into the macromolecule, has already been described in detail in many patents and other technical literature. For example, synthesis of the copolymers of vinyl sulfonic acid with acrylamide and vinyl pyrrolidone was published in J. Polymer Sci., 38,147 (1959).

In DBP 1 101 760, a process is described for forming water-soluble copolymers from vinyl sulfonic acid and acrylonitrile and/or methacrylonitrile, if necessary in a mixture with other monomer combination. Copolymers from vinyl and/or alkyl sulfonates with acrylamides and vinyl amides, for example, are described in DAS 2 444 108.

Water-soluble copolymers, containing 2-acrylamido-2-methyl propane sulfonic acid-(3) (hereinafter referred to as AMPS) as co-monomers, are described in U.S. Pat. Nos. 3,953,342, 3,768,565, 3,907,927, 3,926,718, 3,948,783 as well as DOS 2,502,012 and 2,547,773.

Copolymers produced from vinyl sulfonic acid, vinyl imidazole, acrylic acid, butyl methacrylate and methacrylamide can be used, according to DE-OS 2 457 117, as case in substitute for paper making. According to the Japanese Kokai 74-36402 (CA 81, 84441c), a copolymer of vinyl, imidazole, acrylamide and acrylic acid at the molar ratio of 5:90:5 can be used as a desensitizer for photographic emulsions. Formation of copolymers of vinyl imidazole and acrylic acid, for example, is presented in "Macromolecules" (1973) 6(2), pp. 163-168, as well as in J. Am. Soc., Div. Polym. Chem. (1972) 13(1), pp. 364-366, and their use as a binder for photographic emulsions is presented in West German patent application 2 182 170. The preparation of vinyl imidazole/acrylamide copolymers through suspension polymerization is presented also in DE-OS 20 09 218, and the use of such copolymers for manufacturing offset printing plates is presented in DE-OS No. 21 66 358.

The copolymers covered by this invention, containing co-monomers of formula II, in which $R^1$ together with $R^2$ are trimethylene, can be produced by a known method published in U.S. Pat. No. 3,929,741 by reacting the monomers at temperatures of approximately 10° to 120° C., preferably at 40° to 80° C., in the presence of suitable polymerizing catalyst.

If, under known conditions, copolymerization is carried out of AMPS or vinyl sulfonic acid with acyclic N-vinyl amides, i.e. those according to general formula,

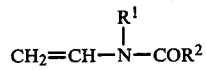

where $R^1$ and $R^2$ are equal or different and stand for hydrogen, methyl or ethyl, secondary reactions occur and polymerization produces water insoluble products.

Thus, the copolymers of the present invention may be prepared by adding to a suitable solvent, a mixture of water and alcohol or a water and water soluble organic solvent, in which copolymer is soluble, an unsaturated sulfonic acid of formula Ia $$CH_2=CH-Y-SO_3H \qquad (Ia)$$

in an amount ranging from 5 to 90%. To this solution, is added sufficient base to neutralize sulfonic acid. Then is added from about 5 to 60% by weight of 1- or 2-vinylimidazole, 5 to 30% by weight of a vinyl acylamine of formula IIa

where $R^1$ and $R^2$ are equal or different and represent hydrogen, methyl or ethyl, or together are trimethylene to pentamethylene, 0 to 80% by weight of acrylamide and/or methacrylamide, and 0 to 50% by weight of formula Va,

where $R^5$ and $R^6$ have the meanings indicated previously and 0 to 25% by weight of cross-linking agent containing at least two olefinic double bonds. The copolymerization is carried out at 10° to 120° C. by procedures familiar to those skilled in the art.

Copolymers of this invention are preferably prepared by reacting 20 to 80% by weight of unsaturated olefinic sulfonic acid of formula Ia, 5 to 15% by weight of vinyl acylamine of formula IIa, 0 to 40% by weight of acrylamide and/or methacrylamide, 5 to 50% by weight of vinylimidazole, and 0 to 10% by weight of formula Va, and 0 to 25% by weight of cross-linking agent containing at least two olefinic double bonds.

Polymerization can be effected as solution polymerization, as precipitation polymerization, or in a reversed emulsion, for example, according to information given in German patent 1 089 173.

When solution copolymerization is carried out in water or a mixture of water and alcohol, where alcohol has 1-4 carbons and the copolymer is soluble in the water/alcohol mixture, a viscous aqueous or aqueous-/alcoholic solution of copolymer results. The resulting copolymer can be separated by distilling off the solvent or by precipitation by mixing the solution with a water-miscible organic solvent, such as methanol, ethanol, acetone, or other similar solvents. However, it is preferable to use the aqueous and/or aqueous/alcoholic solution obtained immediately for the intended application, after adjustment of a specific desired concentration, if required.

When copolymerization is carried out in an organic, water-miscible solvent, the process occurs under conditions of precipitation polymerization. In this case, the polymer appears immediately in solid form and can be separated by distilling off the solvent, or by drawing off by suction and then drying. Water-miscible organic solvents which are suitable for the production process according to this invention, are especially water-soluble alcohols with 1 to 4 carbon atoms, such as methanol, ethanol, propanol, isopropanol, n-butanol, sec-butanol, iso-butanol, and preferably tertiary butanol.

The water content of the lower alcohols used as solvents should not exceed 6% by weight, because otherwise lumps may form during the polymerization process. It is preferable to work with a water content of 0 to 3%. The quantity of solvent to be used depends, to a certain degree, on the type of co-monomers used. As a rule, 200 to 1000 g of solvent are used per 100 g of total monomers.

In reverse emulsion polymerization the aqueous monomers solution is emulsified in a water insoluble organic solvent, such as cyclohexane, toluene, xylene, heptane or freshly distilled benzene by adding 0.5 to 8%, preferably 1 to 4% of known water-in-oil (W/O) type of emulsifier. Polymerization is initiated by addition of known free radical initiators. The initiator may be of a water-soluble nature and, in this case, it is dissolved in the monomer solution. However, it may also be oil-soluble, and, in this case, it is added to the finished W/O emulsion or to the oil phase. A detailed description of this process can be found, for example, in German patent No. 1 089 173.

Copolymers according to this invention may still be partly saponified. Theoretically, every water-soluble base, whose strength is sufficient for a reaction with the hydrolyzable groups, may be used as a saponifier. However, preference is given to NaOH, KOH, or alkaline salts (especially sodium or potassium carbonate).

The saponifier is added either to the monomer solution or is mixed with the polymer. Hence, depending on the process used, saponification occurs either during polymerization, which under normal circumstances is an exothermic process, or as a result further supply of heat, following the polymerization process. A combination of the two methods is also useful.

Especially preferred copolymers according to this invention and copolymers to be used according to this invention, with an especially high degree of polymerization, are obtained by aqueous solution polymerization using the method called gel polymerization. During this process, 15 to 50% aqueous solutions of comonomers polymerize with known suitable systems of catalysts and, if necessary, with one of the above-mentioned saponifiers without mechanical mixing, using the Trommsdorff-Norrish effect. (See: Bios Final Rep. 363,22, Makromol. Chem. 1, 169 (1947)).

From the high viscosity values of aqueous solutions especially those containing electrolytes of the water soluble copolymers of this invention and produced in this manner and to be used according to this invention, it is possible, on the basis of the usual model experience relative to the connection between viscosity and mean molecular weight of polymeric substances and taking into account the comparative values of similarly structured polymers, to estimate molecular weights of $0.5 \times 10^6$ to $20 \times 10^6$. The polymerization reaction can take place under both normal and high pressure. As usual, the polymerization process can also be carried out in an atmosphere of inert gas, preferably nitrogen.

To initiate the process of polymerization, useful initiators include electromagnetic rays, rich in energy, or the usual chemical polymerization initiators, for example, organic peroxides, such as benzoyl peroxide, tertiary butyl hydroperoxide, methyl-ethyl-ketone-peroxide, cymol-hydroperoxide, Azo-compounds, such as azobisisobutyro-nitrile or azo-bis-(2-amidinopropane)-dihydrochloride

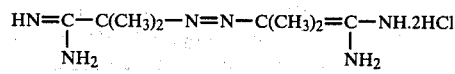

as well as inorganic peroxy compounds such as $(NH_4)_2S_2O_8$ or $K_2S_2O_8$, or $H_2O_2$, if necessary in combinations with reducing agents such as sodium-hydrogen-sulfite and iron-II-sulfate, or redox-systems, containing as the reducing component, an aliphatic and aromatic sulfinic-acid, such as benzene sulfonic acid and toluene sulfinic acid, or derivatives of these acids, such as Mannich adducts from sulfinic acid, aldehydes and amino-compounds, as they are described in German Pat. No. 1 301 566. As a rule, 0.03 to 2 grams of the polymerization iniator is used for 100 grams of total monomers.

The performance properties of the polymers can be further improved by additional heating, over several hours, of the polymer gels obtained in the gel polymerization process, within a temperature range of 50° to 130° C., preferably 70° to 100° C.

Copolymers according to the invention, obtained in this manner in the form of aqueous gel, can, after mechanical disintegration by means of suitable equipment, be dissolved immediately in water and be ready for use. However, they can also be kept in solid form after removal of water by means of customary drying processes and, only when they are to be used, they are dissolved in water again.

Copolymers according to the invention are excellent when used as a drilling fluid additives during drilling operations. During this process, they have an outstanding protective colloidal effect, both at high temperatures and with high electrolyte concentrations, and, especially in view of the stability of electrolytes and resistance to aging, they are greatly superior to the next level of comparable drilling fluid additives for drilling operations, as described in U.S. Pat. No. 2,775,557 and DE-PS Nos. 1 300 481 and 2 444 108. As compared to the copolymers reported in DE-OS 29 31 897,6, the products covered by the invention are characterized by a further enhanced combination of valuable technical properties, which have a favorable impact especially in applications for critical drilling operations under difficult conditions at great depths and in the presence of formation water with a very high content of electrolytes.

Furthermore, polymers according to the invention are notable for their stability to 10 to 40% mineral acids, such as HCl, $HNO_3$, $H_2SO_4$, $HClO_4$, etc., as well as stability to organic acids, such as HCOOH and $CH_3COOH$. There is no precipitation even if the acid solutions are stored for several hours. Hence, copolymers according to the invention are excellent for use as thickeners for acids.

To produce aqueous drilling fluid additives for drilling operations, the polymers according to the invention are used in concentrations ranging from 0.5 to 40 kg/m$^3$, preferably 3 to 30 kg/m$^3$. In order to increase viscosity and seal off the drilled formations, the drilling fluid contains predominantly bentonite. The sealing effect of drilling muds is increased by adding barite, $CaCO_3$ and iron oxide to them.

Bentonite, barite, $CaCO_3$, and iron oxide can be added to the drilling fluid for drilling operations either individually or in widely varied mixture proportions. The upward limiting factor are the rheological properties of drilling muds.

If copolymers according to the invention are added to the standard deep-well cementing muds, the resulting products have considerably improved rheological and setting properties.

The following abbreviations were used in the examples given below, which illustrate the production of water-soluble copolymers to be used according to the invention, and in the attached table:

| | |
|---|---|
| VA | N—vinyl acetamide |
| AM | Acrylamide |
| VMA | N—Vinyl-N—methyl-acetamide |
| AMPS | 2-Acrylamido-2-methyl-propane sulfonic acid-(3), whereby the superscript 1 stands for $NH_4$-salt, and 2 for Na-salt, |
| VFA | Vinyl formamide |
| VIM | 1-Vinyl imidazole |
| VPYR | N—vinyl pyrrolidone |
| VCAP | N—vinyl caprolactam |
| VSS—Na | Vinyl sulfonic acid-Na-salt |
| MAM | Methacrylamide |
| IBOMA | Isobornylmethacrylate |
| PVA | Poly(vinyl alcohol) |
| DVB | Divinyl benzene |
| TMPTA | Trimethylolpropane triacrylate |

In the column "Catalysts",
A stands for azoisobutyronitrile,
B for ammonium persulfate, and C for azobis (2-amidinopropane) dihydrochloride.

In the following examples the reported K-values are according to Fikentscher, "Cellulosechemie", Vol. 13, page 58 (1932).

EXAMPLE 1

600 ml of tertiary butanol is placed into a 2-liter polymerization flask, equipped with stirrer, a return-flow cooler, dropping funnel, gas supply pipe, electrically-heated water bath, and inside, 65 g of AMPS is suspended while stirring. After this is done, 7.1 liters of $NH_3$ gas is introduced and, finally, 15 g of VMA and 29 g of 1-vinyl-imidazole are added. While nitrogen is being purged, the reactive mixture is heated by the electric water bath to 60° C. and 1.0 g of azobisisobutyronitrile is added. After an induction period of approximately two hours, polymerization starts; the reaction temperature rises to 69° C. and polymer precipitates. Additional heating continue for two more hours whereby a viscous suspension arises. Polymer can be separated by decanting the solvent and drying under vacuum at 50° C. However, the solvent can also be removed by distillation under reduced pressure directly from the reaction mixture. Polymer is obtained in the form of white, light powder, easily soluble in water. K-value according to Fikentscher is 195. Using this process, it is also possible to produce the copolymers listed in Table 1.

EXAMPLE 2

Using the apparatus described in Example 1, 540 g of water, 20 g of a 25% solution of vinyl sulfonic acid-Na-salt, and 60 g of AMPS are added to it. By adding 42.7 g of 27% aqueous sodium hydroxide, the solution is adjusted at pH of 9.0. After adding 10 g of 1-vinyl-imidazole, 10 g of VMA and 15 g of acrylamide, the solution is heated to 60° C., while it is being stirred and slow stream of $N_2$ is passed through. At this temperature, polymerization is initiated by adding a solution containing 0.5 g of azo bisisobutyronitrile in 2.5 g of dimethylformamide. After an induction period of approximately thirty minutes, polymerization starts; the temperature rises to 65° C. and the reaction mixture becomes viscous. Additional heating at 80° C. continues for two more hours. The resulting product of clear, yellowish, highly viscous solution with Fikentscher K-value of 205, can be used directly as drilling fluid additive for drilling operations. Similarly, it is also possible to synthesize the copolymers compiled in Table II, for which water serves as the reaction medium.

EXAMPLE 3

280 ml of water is poured into a one-liter polymerization flask, equipped with a stirrer, gas supply pipe, and a thermometer, and 102 g of AMPS is dissolved in it. By adding 72.5 g of 27% sodium hydroxide the solution is adjusted to pH of 9.5. The reaction was cooled to prevent the temperature from rising above the ambient temperature. After adding 80 g of acrylamide, 14 g of VFA, and 14 g of 1-vinyl imidazole, the solution is set at a temperature of 22° C. and the catalyst solution, consisting of 10 ml of water, 0.1 g of dibutylaminehydrochloride and 0.1 g of ammonium persulfate, is added. When this is done, the stirrer is removed and a weak $N_2$ flow is introduced into the solution. After an induction period of approximately fifty minutes, the process of polymerization begins, and the temperature rises during a period of approximately sixty minutes to 84° C. Additional heating is completed for two hours. The resulting slightly turbid and yellow-brown gel, which can be cut after cooling, has a K-value of 215 according to Fikentscher. The polymer can also be converted into the form of an easily water-soluble powder by breaking up the gel mechanically, and drying it either by freeze-drying or at elevated temperature and, finally, using an already known method, e.g. a vibrating crusher, grind it into a fine powder.

In examples 4-11 and 15-24 the monomers indicated in Table I are produced by the procedure according to Example 1 and examples 12-14 are prepared according to the procedure of example 2.

with 15.8 g of 27% NaOH, under cooling, the pH was adjusted to 7.3 to 7.5 (solution II).

Now, at room temperature, solution II is emulsified in solution I. After this is done, and during a thorough stirring, the emulsion is purged for thirty minutes with nitrogen and finally heated to 60° C. As soon as this temperature is reached, a solution of 25 g of dicyclohexyl-peroxidicarbonate in 0.5 ml of toluene is injected; then the heating bath is removed and the stirring speed is reduced to 100 r.p.m. Inside temperature rises within several minutes to 78° C. (T-max), and at the same time the emulsion becomes increasingly more transparent. When the main reaction fades out, heating continued for thirty minutes at 70° C. and then cooled to room

TABLE I

| Example | K—Value | AM | MAM | AMPS | VSS-Na | VMA | VFA | VIM | VPYR | VCAP | Catalyst | Reaction medium |
|---|---|---|---|---|---|---|---|---|---|---|---|---|
| 4 | 196 | | | 65[1] | | 20 | | 15 | | | A | tert.Butanol |
| 5 | 199 | 13,5 | | 58,6[1] | | 18 | | 9,9 | | | A | " |
| 6 | 176 | | | 70[1] | | 10 | | 20 | | | A | " |
| 7 | 170 | | | 45[1] | | 5 | | 50 | | | A | " |
| 8 | 160,5 | 20 | | 20[1] | | 5 | | 55 | | | A | " |
| 9 | 180 | 15 | | 55[1] | | | | 20 | 10 | | A | " |
| 10 | 178 | 15 | | 55[1] | | | | 20 | | 10 | | " |
| 11 | 101 | 15 | | 50 | 10 | 5 | | 20 | | | A | " |
| 12 | 89 | | 20 | 60 | | 10 | | 10 | | | B | water |
| 13 | 95 | | 15 | 50 | | | 5 | 20 | 10 | | B | water |
| 14 | 118 | 20 | | | 40 | | 10 | 10 | | 20 | B | water |

| | | | | | | Comonomer V | | | Reaction |
| Example | K—value | AM | VMA | AMPS | VIM | R[3] | R[6] | VCAP | Catalyst | Medium |
|---|---|---|---|---|---|---|---|---|---|---|
| 15 | 191 | 10 | | 65 | 10 | H | —COOCH₃ | 15 | A | tert.Butanol |
| 16 | 155 | 10 | | 65 | 10 | H | —COO—(n)—C₄H₉ | 15 | " | " |
| 17 | 125 | 10 | | 65 | 10 | —CH₃ | —COOCH₃ | 15 | " | " |
| 18 | 129,5 | 10 | | 65 | 10 | —CH₃ | —COOCH₂CH₂OH | 15 | " | " |
| 19 | 123 | 10 | | 65 | 10 | H | —O—COCH₃ | 15 | " | " |
| 20 | 110 | 10 | | 65 | 10 | H | —COO—(2-ethyl-hexyl) | 15 | " | " |
| 21 | 98 | 10 | | 65 | 10 | H | Phenyl | 15 | " | " |
| 22 | 83 | 10 | | 65 | 10 | H | —COO—tert.-Butyl | 15 | " | " |
| 23 | 127 | 10 | | 65 | 10 | H | —COO—(n)-Dodecyl | 15 | " | " |
| 24 | 136 | 10 | | 65 | 10 | H | —COO-Isobornyl | 15 | " | " |

Examples 25-30 are according to the procedure of Example 2.

temperature.

The resulting product is a low-viscous W/O-emul-

TABLE II

| Example | K—value | AM | MAM | AMPS | VA | VMA | VFA | VIM | VPYR | TMPTA | DVB | Catalyst | Reaction Medium |
|---|---|---|---|---|---|---|---|---|---|---|---|---|---|
| 25 | 209 | | 15 | 65[1] | | | | 20 | | | | A | water |
| 26 | 176 | 65 | | 10 | | | 5 | 20 | | | | B | water |
| 27 | 112 | | | 71 | 14 | | | 10 | | 5 | | C | " |
| 28 | 139 | | | 74 | 15 | | | 11 | | | | C | " |
| 29 | 124 | 22 | | 58 | | | | 10 | 9 | | 1 | C | " |
| 30 | 136 | | | 65 | 13 | 13 | | 9 | | | | C | " |

EXAMPLE 31

In a one-liter glass flask, equipped with stirrer, return flow cooler and gas supply pipe, prepare a solution consisting of 70.2 g of Isopar M ® marketed by Exxon Corporation which is a technical isoparaffin mixture with boiling range of 200° to 240° C., of 3.1 g of sorbitan-trioleate with 20 g mol. ethylene oxide and 6.2 g of diglycerin-sesquioleate (solution 1).

In another flask, 23.4 g of 2-acrylamido-2-methyl-propane sulfonic acid (AMPS), 7.8 g of vinyl imidazole, 7.8 g of N-vinyl formamide and 39.0 g of acrylamide are successively dissolved in 86.6 g of deionized water and sion, stable in storage, with polymer content of 30%. Copolymers can be easily obtained in powder from by pouring the existing emulsion into an excess amount of acetone. During this process, copolymer precipitates and can be separated; for example, through filtering off, draining off, or centrifuging, and, if necessary, through additional washing with acetone. The K-value is 139.

EXAMPLES 32-40

The procedure is the same as Example 31. However, the water phase (solution II) has the composition given in the following Table III.

TABLE III

| Example Number | Composition of Solution II in Grams | | | | | | NaOH 27% | K-value at 25° C. |
|---|---|---|---|---|---|---|---|---|
| | AMPS | AM | VIM | VMA | VFA | VPYR | H₂O | | |
| 32 | 46.8 | 23.4 | 3.9 | | 3.9 | | 69.4 | 33.0 | 500 |
| 33 | 50.7 | | 15.6 | 11.7 | | | 67.4 | 35.0 | 430 |
| 34 | 39.0 | 15.6 | 15.6 | 7.8 | | | 76.4 | 25.5 | 442 |
| 35 | 31.2 | 31.2 | 10.6 | 5.0 | | | 81.4 | 21.0 | 245 |
| 36 | 39.0 | | 23.4 | | 15.6 | | 77.4 | 25.0 | 117 |
| 37 | 42.9 | 3.9 | 15.6 | | 15.6 | | 74.9 | 27.5 | 183 |
| 38 | 15.9 | 46.8 | 3.9 | | 11.7 | | 92.2 | 10.2 | 242 |
| 39 | 62.4 | | 3.9 | | | 11.7 | 62.4 | 40.0 | 128 |
| 40 | 54.6 | 11.7 | 5.8 | 2.0 | | 3.9 | 67.4 | 35.0 | 268 |

As described above, polymers can be separated by precipitation with a water-miscible solvent, which is also miscible with the oil phase, such as acetone.

To invert the W/O-emulsion, we put 1.67 g of it into 10 ml of deionized water, in which 0.25 g of a nonylphenol-ethyleneoxide adduct with 10 moles ethylene oxide per mole of nonylphenol were previously dissolved. We then stir ten minutes and, finally, dilute with deionized water to 100 g. K-values of the 0.05% solutions, obtained in this manner, are given.

EXAMPLE 41

Using the apparatus described in Example 1, 70 ml of water, 15 g of AMPS Na-Salt, 3 g of 1-vinylimidazole, and 1.5 g of PVA-88% hydrolyzed, are added and stirred until dissolved. After this 3 g of IBOMA in 30 ml of ISOPAR M ® (organic hydrocarbon solvent) were added. Two layers were mixed by a mechanical stirrer and simultaneously purged with nitrogen for 2 hours. Then 3.5 ml of an emulsifying agent (HLB 6-7) was added and the reaction mixture was stirred vigorously. At that point 60 mgs of 2,2'-azobis(2-amidinopropane) dihydrochloride was added as a free radical initiator. The reaction mixture was then slowly heated to 60° C., while stirring continued at low speed. A milky gel resulted in 2 hours however, additional heating at 60° C. was continued for 16 hours. The polymer was then rendered in a powdered form by the procedure described previously under Example 31. The K value is 142.

Using this process, it is also possible to produce the copolymers listed in Table IV.

TABLE IV

| Example Number | Percentage Composition of Monomers | | | | | | | K-value |
|---|---|---|---|---|---|---|---|---|
| | AMPS² | VMA | VIM | IBOMA | PVA | DVB | TMPTA | |
| 42 | 74 | | 7 | 15 | | 4 | | 256 |
| 43 | 74 | | 7 | 15 | | | 4 | 283 |
| 44 | 65 | | 13 | 13 | 6 | 3 | | 132 |
| 45 | 56 | | 22 | 22 | | | | 158 |
| 46 | 64 | 12 | 12 | 12 | | | | 133 |
| 47 | 60 | 12 | 8 | 20 | | | | 123 |

EXAMPLES 48–56

Polymers according to the monomers indicated below are prepared:

| Example | K value | AMPS | VMA | VIM | IBOMA | CROSS-LINKING AGENT |
|---|---|---|---|---|---|---|
| 48 | 178 | 74 | 15 | 11 | | |
| 49 | 156 | 74 | 15 | 11 | | 44% TMPTA |
| 50 | 138 | 71.5 | | 14.25 | 14.25 | 3.5% DVB |
| 51 | 201 | 77 | | 7.6 | 15.4 | 3.8% DVB |
| 52 | 188 | 77 | | 7.6 | 15.4 | 3.8% TMPTA |
| 53 | 165 | 71.5 | | 14.25 | 14.25 | 7.1% PVA |
| 54 | 153 | 71.5 | | 14.25 | 14.25 | 7.1% PVA 3.5% DVB |
| 55 | 140 | 55.5 | | 22.25 | 22.25 | — |

All examples made in tert-butanol.

4 g of a polymer from the indicated examples are added to a drilling mud system consisting of 350 ml synthetic seawater 21 g Attapulgite and 10 g Illite the pH is adjusted to 9.5.

In Table V the fluid loss of the indicated polymers is shown.

TABLE V

| Product | Fluid Loss | | | |
|---|---|---|---|---|
| | Initial | 350° F. | 375° F. | 400° F. |
| Ex. 49 | 49 | 11.9 | 28 | 65 |
| Ex. 50 | 50 | 18.5 | 39 | 72 |
| Ex. 51 | 51 | 13.2 | 20 | 80 |
| Ex. 52 | 52 | 12.8 | 22.0 | 84 |
| Ex. 53 | 53 | 18.2 | 15.8 | 46 |
| Ex. 54 | 54 | 14.4 | 15.5 | 72 |
| Ex. 55 | 55 | 23.8 | 38.2 | 64 |
| CYPAN | 8.0 | 58.0 | 72.0 | 98 |

For Example 48, the initial fluid loss of this composition is 10.5 ml. After heat aging for 16 hours at 300° F., the fluid loss is 19.5 ml. A commercial available polymer (Cypan) showed fluid loss of 58 ml. after 1r hours heat aging at 300° F.

EXAMPLE 56

The above individual polymers are added separately to laboratory prepared drilling fluids composed of 21 pounds per barrel of attapulgite clay and 10 pounds per barrel of illite clay in one barrel of synthetic sea water. This drilling fluid has a high fluid loss when left untreated with a fluid loss control polymer. Four pounds per barrel of each polymer are added to individual barrel equivalents of the above prepared drilling fluid, and the degree of fluid loss control in each drilling fluid is measured according to the standard, and well-known, thirty minute fluid loss control test as specified by the American Petroleum Institute. All of the drilling fluids are then heated for a sixteen hour period and then the fluid loss control properties are remeasured. It is found that these polymers exhibit varying degrees of improved fluid loss control over existing commercially available polymers marketed for this purpose and also varying degrees of improved resistance to thermal degradation of fluid loss control performance. For example in one case the measured fluid loss of the base mud is initially 98.0 ml and this is reduced to 9.5 ml in a similar mud by the addition of 4 pounds per barrel of the polymer according to Example 4. After 16 hours aging at 350° F. the measured fluid loss is 13.5 ml and after 16 hours at 375° F. is 18.0 ml. In a drilling fluid of the same base mud the addition of four pounds per barrel of Cypan ®, a registered trademark of American Cyanamid, which is a water soluble polyacrylate used as a fluid loss control polymer, the initial fluid loss is found to be 8.0 ml and after aging for 16 hours at 350° F. the measured fluid loss is 58.0 ml and after 16 hours at 375° F. the measured fluid loss is 72.0 ml.

The polymers according to the present invention show outstanding properties as far as the tolerance against divalent cations, specifically calcium, is concerned, which is shown in the following Table VI.

The same drilling mud system is used as indicated in the Examples of Table V, but in this case different amounts of $CaCl_2$ are added as contaminants.

TABLE VI

CALCIUM TOLERANCE TESTS

| POLYMER COMPOSITION | lb/bbl $CaCl_2$ | 16 hrs. AGING TEMP. | VISCOSITY, CENTIPOISE | API FLUID LOSS, ml |
|---|---|---|---|---|
| CYPAN | 0 | Room Temp. | 19 | 8.0 |
| | 1 | | 25 | 9.0 |
| | 2 | | 27 | 16.0 |
| | 4 | | 15 | 47.0 |
| CYPAN | 0 | 350° F. | 16 | 58.0 |
| | 1 | | 17 | 68.0 |
| | 2 | | 22 | 55.0 |
| | 4 | | 11 | 117.0 |
| CYPAN | 0 | 375° F. | 11 | 72.0 |
| | 1 | | 14 | 85.0 |
| | 2 | | 12 | 90.0 |
| | 4 | | 14 | 160.0 |
| EX 4. | 0 | Room Temp. | 9 | 9.5 |
| | 1 | | 9 | 9.5 |
| | 2 | | 10 | 9.5 |
| | 4 | | 8 | 10.0 |
| EX 4. | 0 | 350° F. | 11 | 13.5 |
| | 1 | | 9 | 14.0 |
| | 2 | | 10 | 15.0 |
| | 4 | | 10 | 15.5 |
| EX 4. | 0 | 375° F. | 10 | 18.0 |
| | 1 | | 9 | 17.0 |
| | 2 | | 11 | 22.0 |
| | 4 | | 9 | 25.0 |

What is claimed is:
1. Water-soluble copolymers containing structural units of
(a) 1 to 95% by weight of structural units of formula I

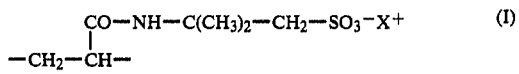

(b) 0 to 30% by weight of structural units of formula II

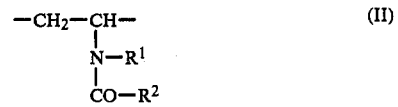

(c) 0 to 80% by weight of structural units of formula III

(d) 5 to 60% by weight of structural units of formula IV

(e) 0 to 50% by weight of structural units of formula V

and
(f) 0 to 25% by weight of a cross linking agent containing at least two olefinic double bonds;
$R^1$ and $R^2$ are the same or different and represent hydrogen, methyl or ethyl or together are trimethylene to pentamethylene;
$R^3$ and $R^5$ represents hydrogen or methyl;
$R^4$ represent a imidazolyl-(1) or imidazolyl-(2) moiety;
$R^6$ represent hydroxy, alkoxycarbonyl with 1 to 12 carbon atoms in a alkoxy moiety cycloalkoxycarbonyl with 6 to 10 carbon atoms in cycloalkoxy moiety, phenyl, alkanoyloxy with 1 to 4 carbon atoms, or β-hydroxyalkoxy-carbonyl with 2 or 3 carbon atoms in hydroxyalkoxy moiety;
$X^+$ is a cation.
2. Water-soluble copolymers containing structural units of
(a) 5 to 90% by weight of structural units of formula I

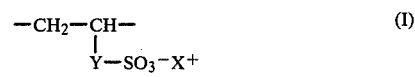

(b) 5 to 30% by weight of structural units of formula II

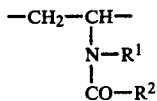 (II)

(c) 0 to 80% by weight of structural units of formula III

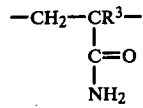 (III)

(d) 5 to 60% by weight of structural units of formula IV

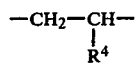 (IV)

(e) 0 to 50% by weight of structural units of formula V

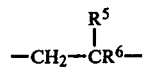 (V)

(f) 0 to 25% by weight of a crosslinking agent containing at least two olefinic double bonds; wherein
$R^1$ and $R^2$ are the same or different and represent hydrogen, methyl or ethyl or together are trimethylene to pentamethylene;
$R^3$ and $R^5$ represents hydrogen or methyl;
$R^4$ represent a imidazolyl-(1) or imidazolyl-(2) moiety;
$R^6$ represent hydroxy, alkoxycarbonyl with 1 to 12 carbon atoms in a alkoxy moiety cycloalkoxycarbonyl with 6 to 10 carbon atoms in cycloalkoxy moiety, phenyl, alkanoyloxy with 1 to 4 carbon atoms, or β-hydroxyalkoxy-carbonyl with 2 or 3 carbon atoms in hydroxyalkoxy moiety;
Y is a single covalent bond or the formula $-CO-NH-C(CH_3)_2-CH_2-$; and
$X^+$ is a cation.

3. Water-soluble copolymers according to claim 1 or claim 2 containing a statistical distribution of
(a) 20 to 80% by weight of formula I,
(b) 0 to 15% by weight of formula II,
(c) 0 to 40% by weight of formula III,
(d) 5 to 50% by weight of formula IV,
(e) 0 to 50% by weight of formula V, and
(f) 0 to 25% by weight of divinylbenzene or trimethylolpropane triacrylate.

4. Water-soluble copolymers according to claim 1 or claim 2 wherein $X^+$ is sodium cation, potassium cation, or

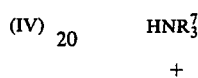

wherein each $R^7$ is the same or different and each is hydrogen, alkyl having 1 to 4 carbon atoms, or hydroxyethyl.

5. Water-soluble copolymers according to claim 1 or claim 2 wherein component (a) is 5 to 90% by weight of

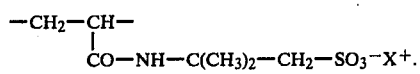

6. Water-soluble copolymers according to claim 1 or claim 2 or claim 3 wherein up to 60% of the structural unit of formula III is in the hydrolyzed form of the formula VI

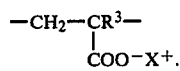 (VI)

* * * * *